US 9,358,586 B2

(12) United States Patent
Brown et al.

(10) Patent No.: US 9,358,586 B2
(45) Date of Patent: Jun. 7, 2016

(54) APPARATUS AND METHOD FOR SEPARATING PLANTS

(71) Applicant: Agricultural Robotics LLC, Redding, CA (US)

(72) Inventors: Claude Edward Brown, Lodi, CA (US); Darrell Mintz, Bow, WA (US); Glenn Sakuma, Bow, WA (US); Bob Tipton, Red Bluff, CA (US); Tom Loftus, Redding, CA (US); Joseph Oran Shannon, Millville, CA (US)

(73) Assignee: Agricultural Robotics LLC, Redding, CA (US)

( * ) Notice: Subject to any disclaimer, the term of this patent is extended or adjusted under 35 U.S.C. 154(b) by 0 days.

(21) Appl. No.: 14/465,096

(22) Filed: Aug. 21, 2014

(65) Prior Publication Data

US 2015/0053593 A1 Feb. 26, 2015

Related U.S. Application Data

(60) Provisional application No. 61/869,026, filed on Aug. 22, 2013.

(51) Int. Cl.
*B07C 5/02* (2006.01)
*B07C 1/04* (2006.01)
*A01G 1/00* (2006.01)
(Continued)

(52) U.S. Cl.
CPC ... *B07C 1/04* (2013.01); *A01G 1/00* (2013.01); *B07C 5/34* (2013.01); *B07C 5/3422* (2013.01); *B65G 37/00* (2013.01); *B65G 47/31* (2013.01); *A01D 61/02* (2013.01)

(58) Field of Classification Search
CPC .............. B07C 1/00; B07C 1/10; B07C 3/14; B07C 5/34; B07C 5/342; B07C 2501/0081; B65G 15/58; B65G 47/42; A01D 61/02
USPC ........ 209/3.1, 509, 576, 616, 699; 198/478.1; 56/35, 46, 62, 16.5; 171/128, 13, 14, 171/18, 52; 460/2, 88
See application file for complete search history.

(56) References Cited

U.S. PATENT DOCUMENTS 806,995 A * 12/1905 Robinson ........................ 460/81
4,018,391 A * 4/1977 Jacobsen .................... 241/152.2
(Continued)

FOREIGN PATENT DOCUMENTS

| RU | 2 093 976 C1 | 10/1997 |
|---|---|---|
| RU | 2 153 791 C1 | 8/2000 |
| SU | 1 083 941 A1 | 4/1984 |

OTHER PUBLICATIONS

EP Extended Search Report, Jan. 22, 2015, Agricultural Robotics LLC.

*Primary Examiner* — Mark Beauchaine
(74) *Attorney, Agent, or Firm* — Steven R. Vosen (57) ABSTRACT

An apparatus and method is presented for separating healthy plants from agricultural material, such as harvested plants. The apparatus includes a conveyor to present the agricultural material to a mesh, which may be, for example bristles. A rotating drum with a plurality of protruding tines moves through the mesh and pulls individual plants from the agricultural material. A machine vision system may then sort the healthy, individual plants. The method includes presenting the agricultural material to the mesh, and then pulling individual plants through the mesh.

32 Claims, 9 Drawing Sheets

(51) Int. Cl.
  *B07C 5/34* (2006.01)
  *B07C 5/342* (2006.01)
  *B65G 37/00* (2006.01)
  *B65G 47/31* (2006.01)
  *A01D 61/02* (2006.01)

(56) References Cited

U.S. PATENT DOCUMENTS

| | | | |
|---|---|---|---|
| 4,174,755 A | 11/1979 | Siri | |
| 4,326,590 A * | 4/1982 | Yancey | 171/61 |
| 4,335,570 A | 6/1982 | Fitzmaurice | |
| 4,570,426 A | 2/1986 | Bettencourt et al. | |
| 4,598,874 A * | 7/1986 | Barnett | 241/37.5 |
| 4,699,275 A * | 10/1987 | Holsonbake | 209/616 |
| 5,138,826 A * | 8/1992 | Hobbs | 56/14.6 |
| 5,197,269 A | 3/1993 | Meester | |
| 5,846,129 A | 12/1998 | Dragt | |
| 5,860,859 A | 1/1999 | Meester | |
| 6,282,877 B1 | 9/2001 | Yoder | |
| 6,298,644 B1 | 10/2001 | Sandei | |
| 7,921,628 B2 | 4/2011 | Meester | |
| 2013/0028487 A1 | 1/2013 | Stager et al. | |

* cited by examiner

APPARATUS AND METHOD FOR SEPARATING PLANTS

CROSS-REFERENCE TO RELATED APPLICATIONS

This application claims the benefit under U.S.C. §119(e) to U.S. Provisional Application No. 61/869,026, filed Aug. 22, 2013, the contents of which are hereby incorporated by reference in its entirety.

BACKGROUND OF THE INVENTION

1. Field of the Invention

The present invention generally relates to agricultural equipment, and more particularly to a method and system for separating plants having intertwined roots.

2. Discussion of the Background

Plants are sometimes raised at nurseries and then transplanted for growing in farms. Strawberries are an example of a crop that is raised this way. Thus, for example, a field of strawberries is grown for a certain period of time, the plants are harvested and packaged for sale as individual plants.

Often, the roots of adjacent plants become intertwined. The manual separation of individual plants is performed manually, and is very labor intensive. In addition, some plants may not be healthy enough to survive transplantation. These plants need to be separated and not sold for transplanting.

There exists a need for a machine and method that can process large quantities of harvested plants and separate them into individual plants. Such a machine and method should be highly automated and be capable of separating the plants without damaging the roots. It would also be advantageous to be able to also eliminate plants that do not seem healthy enough to survive transplanting.

BRIEF SUMMARY OF THE INVENTION

The present invention includes a machine (a "singultor") that can process a large quantity of agricultural material that has been harvested. The agricultural material may include individual plants, clumps of intertwined plants, damaged plants, soil, rocks, and other waste material. The machine includes a conveyor that delivers agricultural material to a device that can provide individual, healthy plants. In one embodiment, the plants are placed on a conveyor and are delivered to a "hold-back device," which may include a mesh such as a row of wires, rubber flaps, or bristles through which the plants are pulled. On the opposite side of hold-back device, a pull-through device includes numerous tines which rotate through the mesh and pull individual or clumps of intertwined plants through the mesh. The tines, for example and without limitation, may move through the mesh and pull plants through the hold-back device. When the plants are pulled, by the tines, through the mesh, individual plants may be separated from intertwined clumps of plants. The plants then pass through a machine vision system which isolates healthy, individual plants from damaged plants, intertwined plants that were not successfully or only partially separated, and waste. Any plants that are still intertwined plants may then be returned to the conveyor in an attempt to separate the plants.

One embodiment of the invention provides an apparatus having a first portion to accept agricultural material and a second portion to provide individual plants from the agricultural material. The apparatus includes: a conveyor having a first conveyor end at the first portion and a second conveyor end; a mesh having a first side contacting the second conveyor end and a second side opposing the second conveyor end; and a pull-through device at the second portion, where the pull-through device includes a plurality of tines, and where the pull-through device moves the plurality of tines through the mesh. When the conveyor moves accepted agricultural material from the first portion to the first side of the mesh, and the plurality of tines moves through the mesh to separate individual plants from agricultural material at the first side and provide individual plants at the second side.

Another embodiment of the invention is a method for processing agricultural material using an apparatus having a first portion to accept agricultural material and a second portion to provide individual plants from the agricultural material. The apparatus includes: a conveyor having a first conveyor end at the first portion and a second conveyor end; a mesh having a first side contacting the second conveyor end and a second side opposing the second conveyor end; and a pull-through device at the second portion, where the pull-through device includes a plurality of tines, and where the pull-through device moves the plurality of tines through the mesh. When the conveyor moves accepted agricultural material from the first portion to the first side of the mesh, and the plurality of tines moves through the mesh to separate individual plants from agricultural material at the first side and provide individual plants at the second side.

Yet another embodiment of the present invention provides a method for processing agricultural material. The method includes: providing two or more intertwined plants to a first side of a mesh; and pulling individual plants from the two or more intertwined plants through the mesh.

Reference symbols are used in the Figures to indicate certain components, aspects or features shown therein, with reference symbols or labels common to more than one Figure indicating like components, aspects or features shown therein.

DETAILED DESCRIPTION OF THE INVENTION

Figure 1:
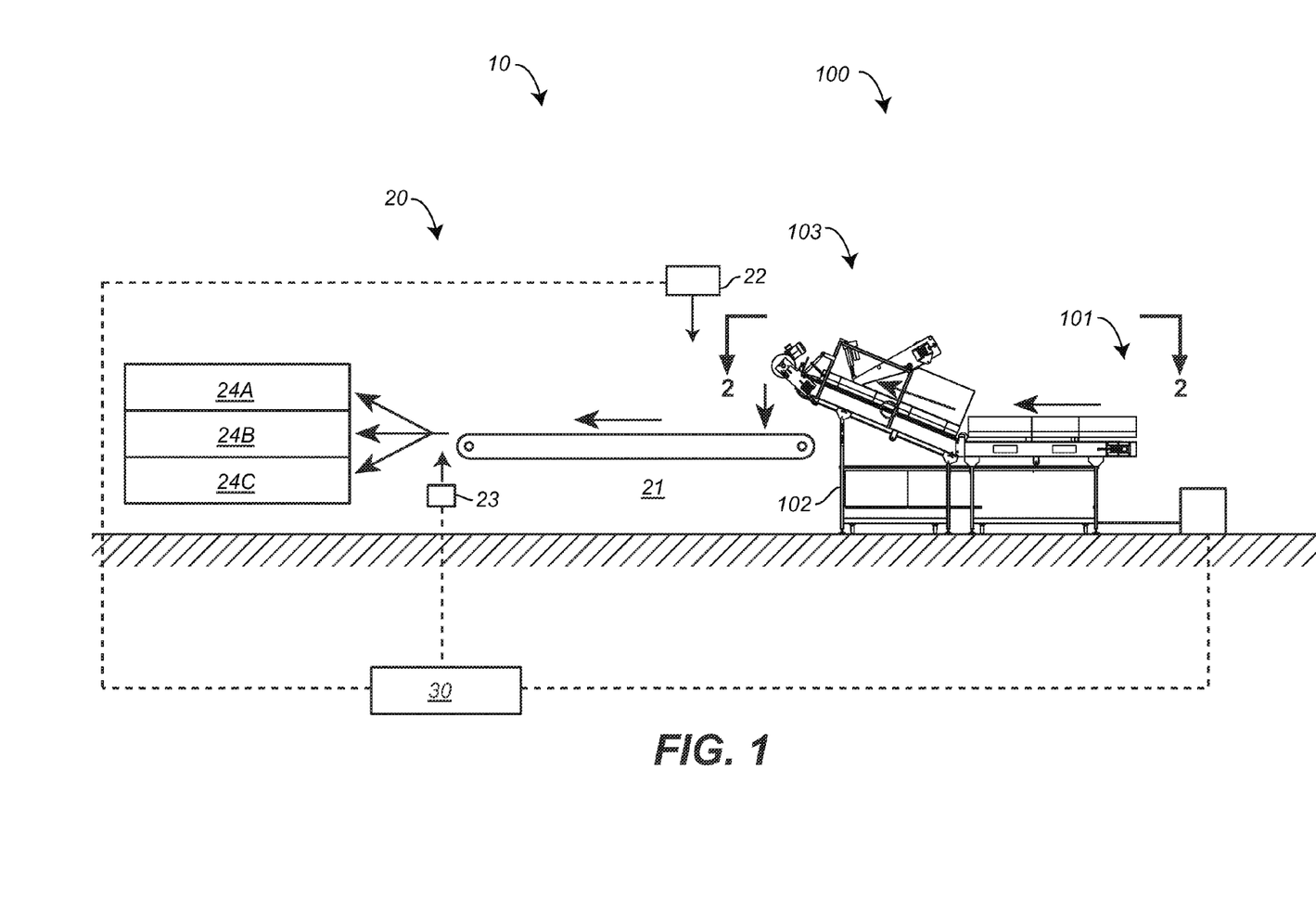
FIG. 1 is side view of one embodiment of a device for separating plants.

FIG. 1 is side view of one embodiment of a device 10 for processing agricultural material into individual plants. In general, the agricultural material may include plants, clumps of plants which their roots intertwined, and waste (damaged plants, dirt, rocks, etc.). Device 10 includes a separating unit, or singulator 100 having a frame 102, a front end 101 for accepting agricultural material and a back end 103 to provide separated agricultural material. The separated material may then be provided to a sorting system 20 that can identify and sort individual plants from the other agricultural material. Sorting system 20 may, for example and without limitation, include a conveyor 21 for accepting material from back end 103, a camera 22, a computer 30, and sorting jets 23 which may direct material into a first bin 24a, a second bin 24b, or a third bin 24b. Computer 101 may also control singulator 100, with or without sorting system 20, by adjusting the speed or other settings of the singulator.

Sorting system 20, while not necessarily part of the present invention, is shown, for example and without limitation, as being accomplished by a machine vision system that includes a Computer, a Camera, and Sorting Jets. In general, a large quantity of material is delivered by the Singulator including: 1) individual, healthy plants; 2) possible clumps of plants that were not successfully separated in the Singulator; and 3) waste that includes plant parts, plants with unhealthy roots, rocks, and/or soil. In the machine vision system, computer 30 processes images from camera 22.

Sorting system 20, while not necessarily part of the present invention, is well known, and is shown, for example and without limitation, as a machine vision sorting system, such as the system described in U.S. Patent Application Publication No. 2013/0028487, the contents of which are hereby incorporated by reference. Sorting system 20 may, for example, include a neural network algorithm that determines, based on training, to recognize individual, healthy plants. Such training may be accomplished by providing sorting system 20 with material of known condition. Thus, for example, the algorithm of sorting system 20 may have a training mode, where the system is presented with materials of known condition (healthy, single plants, multiple plants, etc.) and informed of their condition.

Sorting system 20 may, for example, include programming in computer 30 to process images from camera 22 to classify material on conveyor 22 as being: a single health plant, a clump of two or more plants, or waste material, including plants with damaged roots, dirt, rocks, or other waste material. The classification of material may, for example and without limitation, be done by "training" software in computer 30 using known material—that is known good plants and waste material are sent through sorting system 20, and the system can thus be trained to classify the material. As the material travels to the end of conveyor 21, jets 23 may be instructed from computer 30 to issue jets of air that deflect the material into one of bins 24a, 24b, or 24c based on their classification where, for example and without limitation, bin 24a is for healthy, single plants, bin 24b is for material that may contain unseparated, healthy plants, and bin 24c is for waste material. Healthy plants in bin 24a may then be packaged, multiple plants from bin 24b may be sent through the singulator 100 for re-processing, and waste material in bin 24c may be disposed of.

Figure 2:
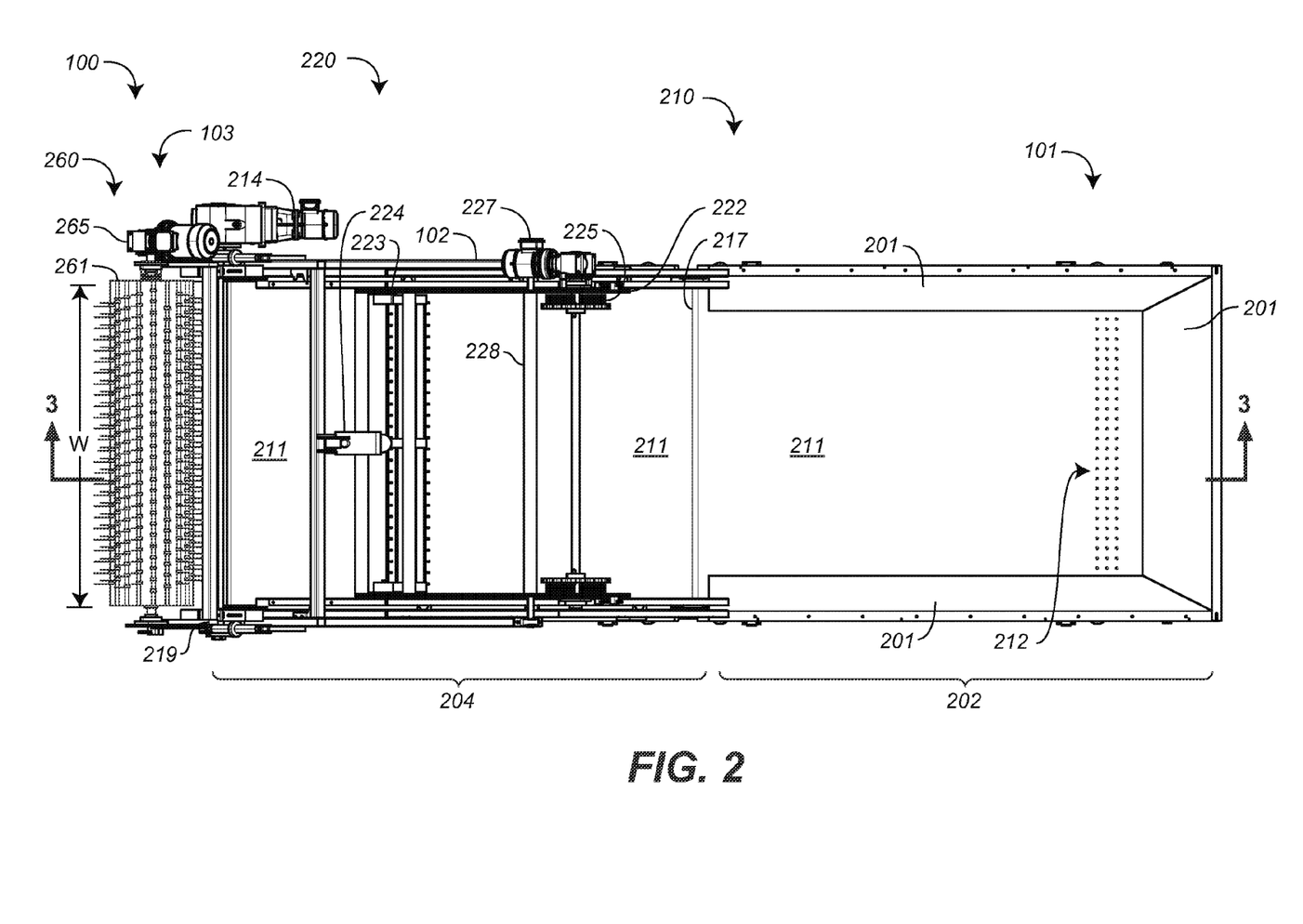
FIG. 2 is a top view of one embodiment of a singultor.
Figure 3:
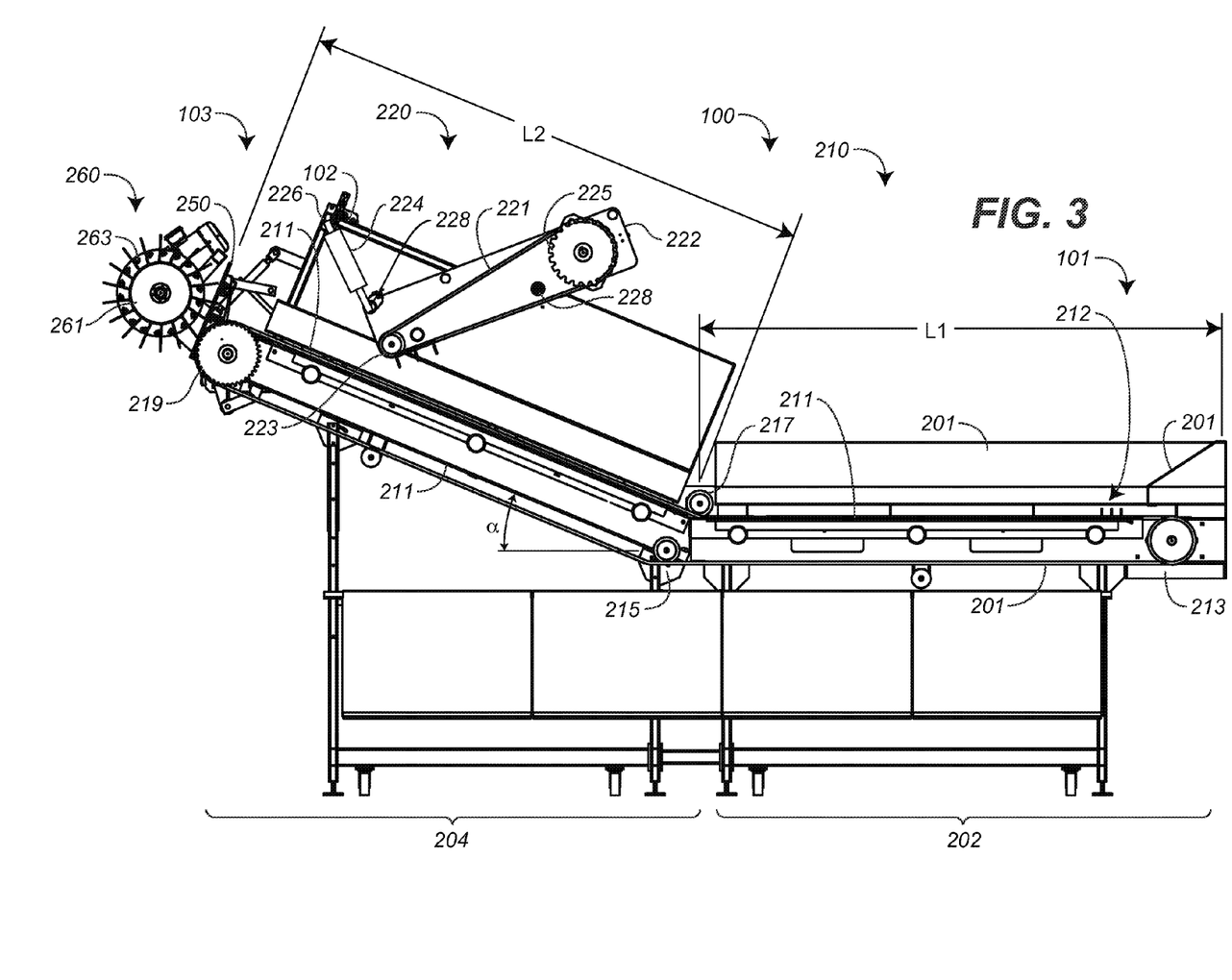
FIG. 3 is a sectional side view 3-3 of FIG. 2.

FIGS. 2 and 3 show one embodiment of singulator 100, where FIG. 2 is a top view of one embodiment of the singulator, and FIG. 3 is a sectional side view 3-3 of FIG. 2.

Singular 100 has a width W and includes a horizontal section 202 having a length L1 and which includes front end 101, and an incline section 204 having a length L2 and which includes back end 103. Incline section 204 extends up an angle α, as shown in FIG. 3, which may be, for example, from 20 to 30 degrees. A conveyor system 210 extends between front end 101 and back end 103, and includes a conveyor belt 211, several rollers 213, 215, and 217 to guide the belt, and a drive gear or roller 219 connected to a drive motor 214 to provide power for moving conveyor belt 211. Rollers 213, 215, 217, and 219 are rotatably mounted to frame 102.

In one embodiment, width W is 1.815 m, L1 is 2.7 m, and L2 is 2.9 m. Drive motor 214 may be, for example, a 1 HP, 3 Phase 1750 RPM motor with a 645:1 right angle thru shaft gearbox (NORD Gear Corp, Waunakee Wis.). Conveyor belt 211 includes vertical protrusions 212 to urge the movement of agricultural material. Protrusions 212 are also referred to herein, without limitation, as pins or pegs. Belt 221, which may include one or more belts, is also referred to as a "pegged belt" 211. For the sake of clarity of the drawing, only three rows of pins 212 are shown. Pins 212 may be provided in a regular pattern along the length of conveyor belt 211.

Figures 7, 8:
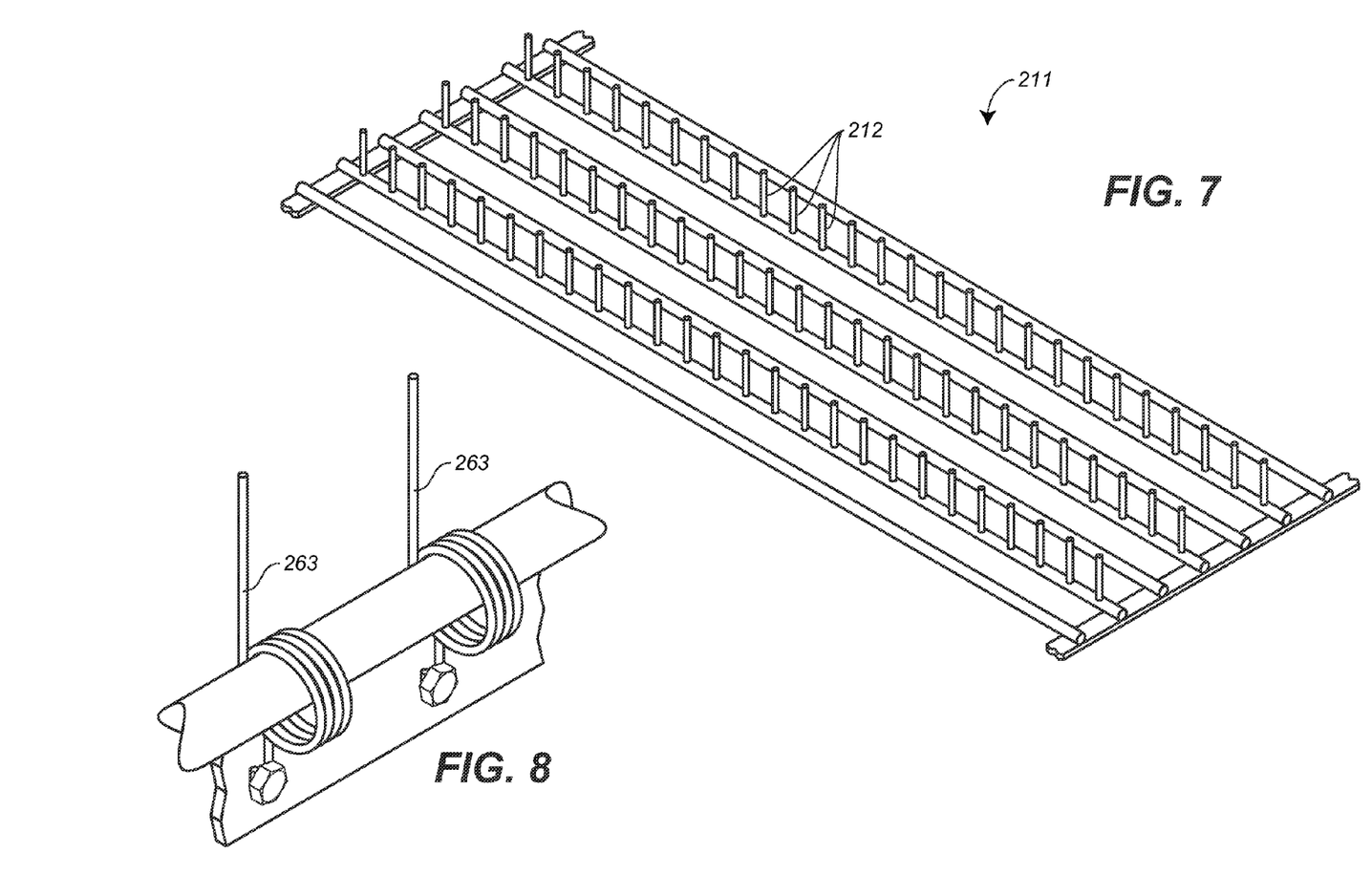
FIG. 7 is a detailed perspective view of one embodiment of the conveyor belt of FIG. 2.
FIG. 8 is a detailed perspective view of one embodiment of the tines of the pull-through device of FIG. 2.

One example of a section of conveyor belt 211 is shown, for example and without limitation, in FIG. 7, in which conveyor belt 211 is shown as having belts 703, which run the length of the conveyor belt, and cross members 701 which run between belts 703. Belt 703 may be, for example and without limitation, a belted chain link belt. Pins 212 are shown and protruding a distance h on every other cross member 701. In one embodiment, h is 0.04 m (1.5 inches).

In certain embodiments, the speed of drive motor 214 is controlled by computer 30, and preferable moves conveyor belt 211 at a speeds of from 1 m/min to 5 m/min or approximately 3 m/min.

A rake-back unit 220 is positioned on top of conveyor belt 211 in incline section 202. Rake-back unit 220 includes a housing 222 that is movably attached to frame 102, and which supports a rotatable drive gear 225 powered by a motor 227 and a roller 223. Rake-back unit 220 also includes a rake-back belt 221 which extends between drive gear or roller 225 and roller 223. Belt 221 may be, for example and without limitation, similar to belt 211 having a chain link belt and protruding pins 229. For the sake of clarity of the drawing, only three rows of pins 229 are shown.

In one embodiment, drive motor 227 may be, for example, a 1 HP, 3 Phase 1750 RPM motor with 50:1 thru shaft gear box (NORD Gear Corp, Waunakee Wis.). Belt 221 maybe a belted chain with vertical protrusions to urge the movement of agricultural material. In certain embodiments, the speed of drive motor 227 is controlled by computer 30, and preferably moves belt 221 as speeds of from 0.1 m/s to 1 m/s. In certain embodiments the drive rollers 219 and 225 rotate in the same direction. In other embodiments drive rollers 219 and 225 rotate in opposite directions useful, for example, in freeing material that may get caught in the belts.

Housing 222 is attached to frame 102 at a hinge 233 on one housing end and, through a pivot 228 to an adjustable actuator 224 that is attached to the frame at a hinge 226. Actuator 224 may be, for example and without limitation, an electrical actuator that has a length that is controllable by computer 30.

A hold-back unit 250 is positioned between rake-back unit 220 and a pull-through unit 260, which includes a roller 261 having a plurality of radially projecting flaps or tines 263, and is rotatably attached to frame 102 and driven by a motor 265.

In one embodiment, motor 265 may be, for example a 3 HP, 3 Phase 1750 RPM motor with 40:1 thru shaft gearbox (NORD Gear Corp, Waunakee Wis.). Roller 261 may rotate at speed of from 10 to 70 RPM. Tines 263 are long enough to pass through hold back unit 250 to interact with agricultural material on conveyor belt 211. In certain embodiments the drive rollers 219 and 261 rotate in the same direction, and in other embodiments drive rollers 219 and 261 rotate in opposite directions.

In one embodiment, tines 263 are flexible torsion springs which return to their original orientation, approximately perpendicular to roller 261 when not in contact with objects or material. Thus, for example there may be 18 rows of tines along different radial axis, and they may be spaced 1 to 3 cm along the length of roller 261.

Figure 4:
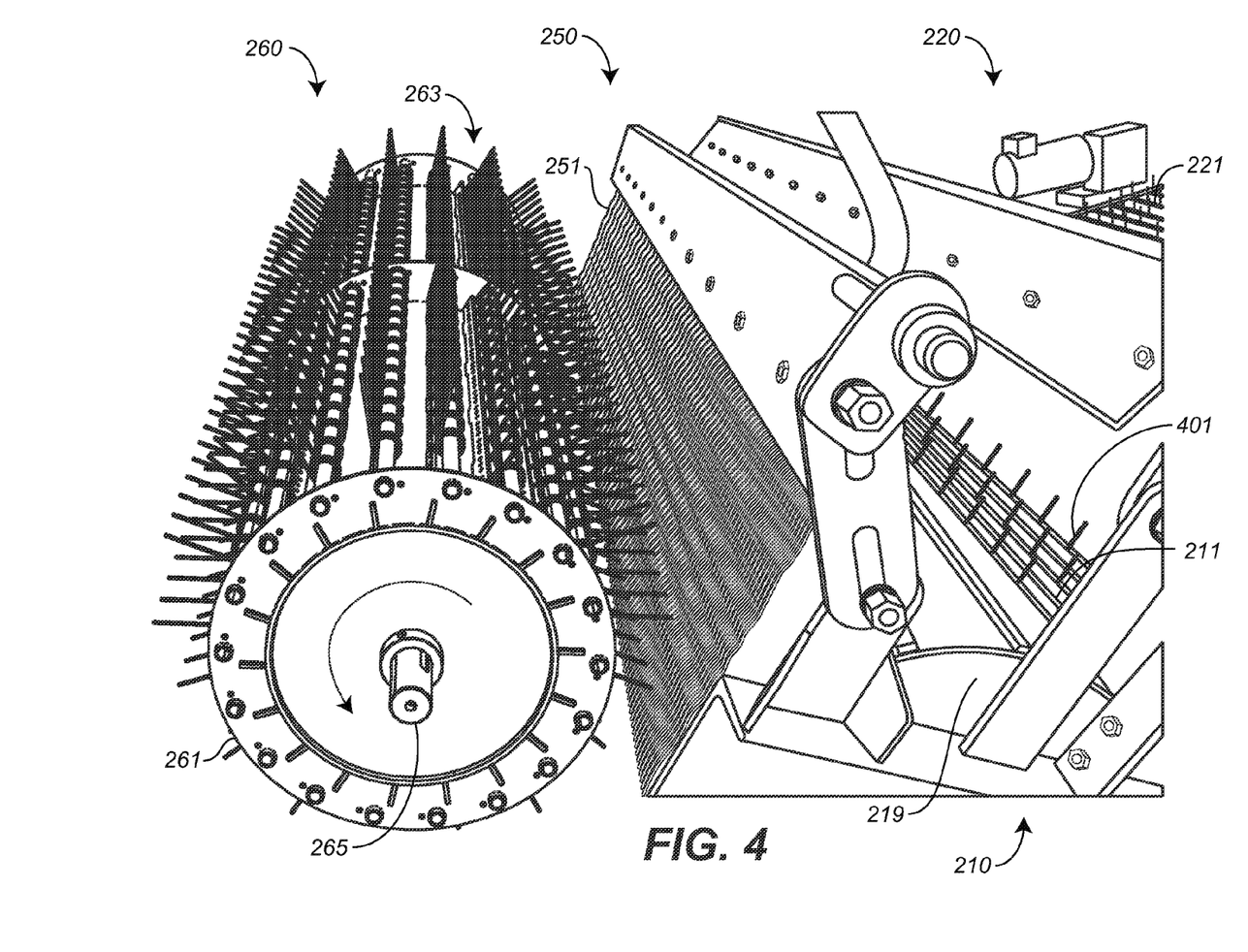
FIG. 4 is a perspective detail view of the singultor of FIG. 2.

FIG. 4 is a perspective detail view of the singulator of FIG. 2. In the view of FIG. 4, roller 261 has end caps 401 which support rods 403 and pipes 405. Each pipe 405 supports one row of tines 263, which protrude from roller 261.

In one embodiment, roller 261 has a radius of 0.18 m (7 inches) about axis 265, pipes 405 are positioned a distance of 0.20 m (8 inches) from the axis, and the tips of tines 263 rotate about a distance of 0.5 m (20 inches) from the axis.

Hold-back unit 250 includes a mesh 251 that contacts conveyor belt 211 and which may be formed from a plurality of strips that are closely spaced. The relative placement of hold-back unit 250 and pull-through unit 260 is such that tines 263 pass through mesh 251—that is, as roller 261 rotates about an axis 267, tines 263 pass through mesh 251. In one embodiment, tines 263 are metal, and may be, for example and without limitation tines that are fixed to roller 261, or torsion springs that are attached to roller 261, and mesh 251 is plastic, which may be, for example and without limitation, a polypropylene 12 inch (0.3 m) strip brush, such as is used in street sweepers. In another embodiment, mesh 251 may be replaced with strips of rubber.

FIG. 8 is a detailed perspective view of one embodiment of tines 263, which show that each tine 263 includes a torsion spring 801 which is attached to bar 403 by a bolt 803. In one embodiment, tines 263 are formed from spring steel. It is preferred that the orientation of torsion spring is such that, as tines 263 rotate through hold-back unit 250, the tines move in the direction indicated by the arrow, such that the spring is compressed, and then returns to the original orientation. In certain embodiments, the straight, protruding portions of tines 263 are between 0.05 m (2 inches) and 0.1 m (4 inches) long, and the curled, spring portion has a diameter of approximately (0.025 m) 1 inch.

FIG. 4 also shows conveyor system 210 and guiding portion 220. As discussed subsequently, material is conveyed between conveyor belt 211 of conveyor system 210 and belt 221 of rake-back 220 to hold back unit 250.

Figure 5:
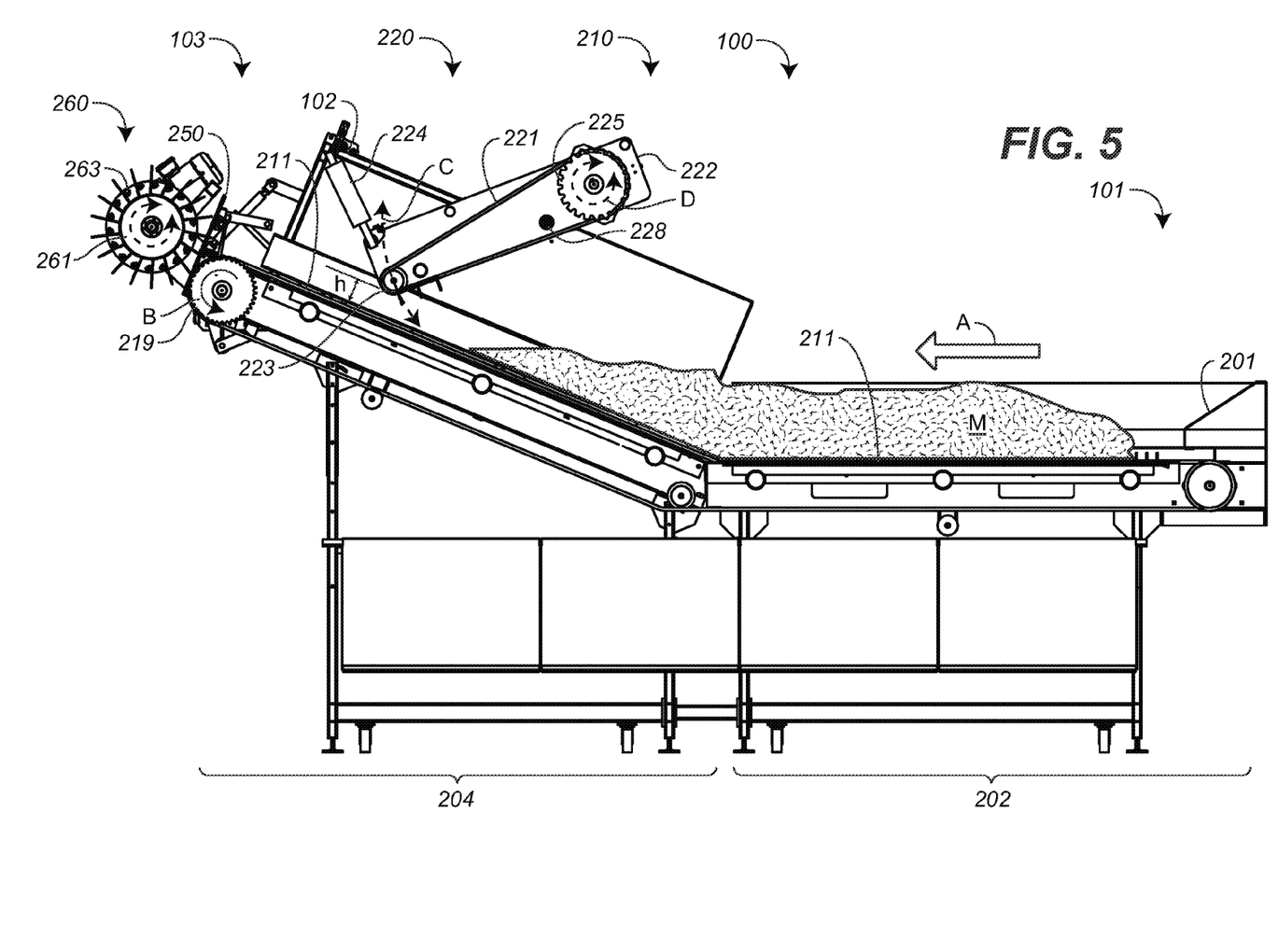
FIG. 5 is a side view 3-3 of FIG. 2 showing material being transported through the inventive device.

The operation of singulator 200 is shown FIG. 5, which is a side view 3-3 of FIG. 2 showing material being transported through the inventive device. As shown in FIG. 5, singulator 100 accepts agricultural material M on conveyor belt 211 and, as indicated by arrow B, the motion of roller 219, moves the material as indicated by arrow A. The material moves up incline section 204, where it may contact belt 221 of rake-back unit 220. A height H provides the maximum height of material M above conveyor belt 211 which may move towards hold-back unit 250. The length of actuator 224, which may be controlled by computer 30, causes rake-back unit 220 to rotate about pivot 228, as indicted by arrow C. As shown by arrow D, drive rollers 225 may rotate to hold back material M on belt 221, or to accelerate the material along the belt.

Figure 6A:
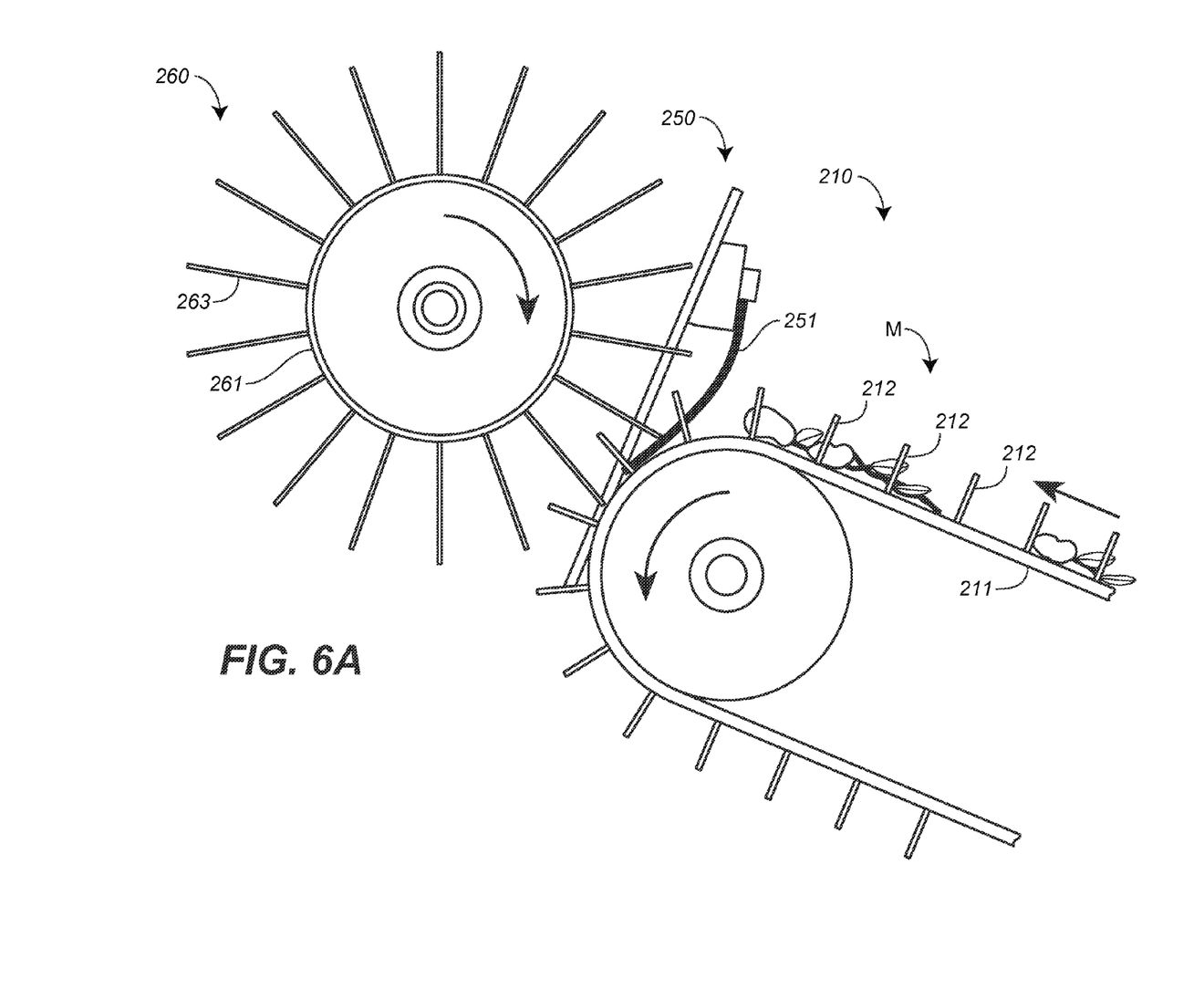
FIGS. 6A, 6B, and 6C are sequential, detailed side views showing material being transported by the pull-through unit through the hold-back unit.
Figure 6B:
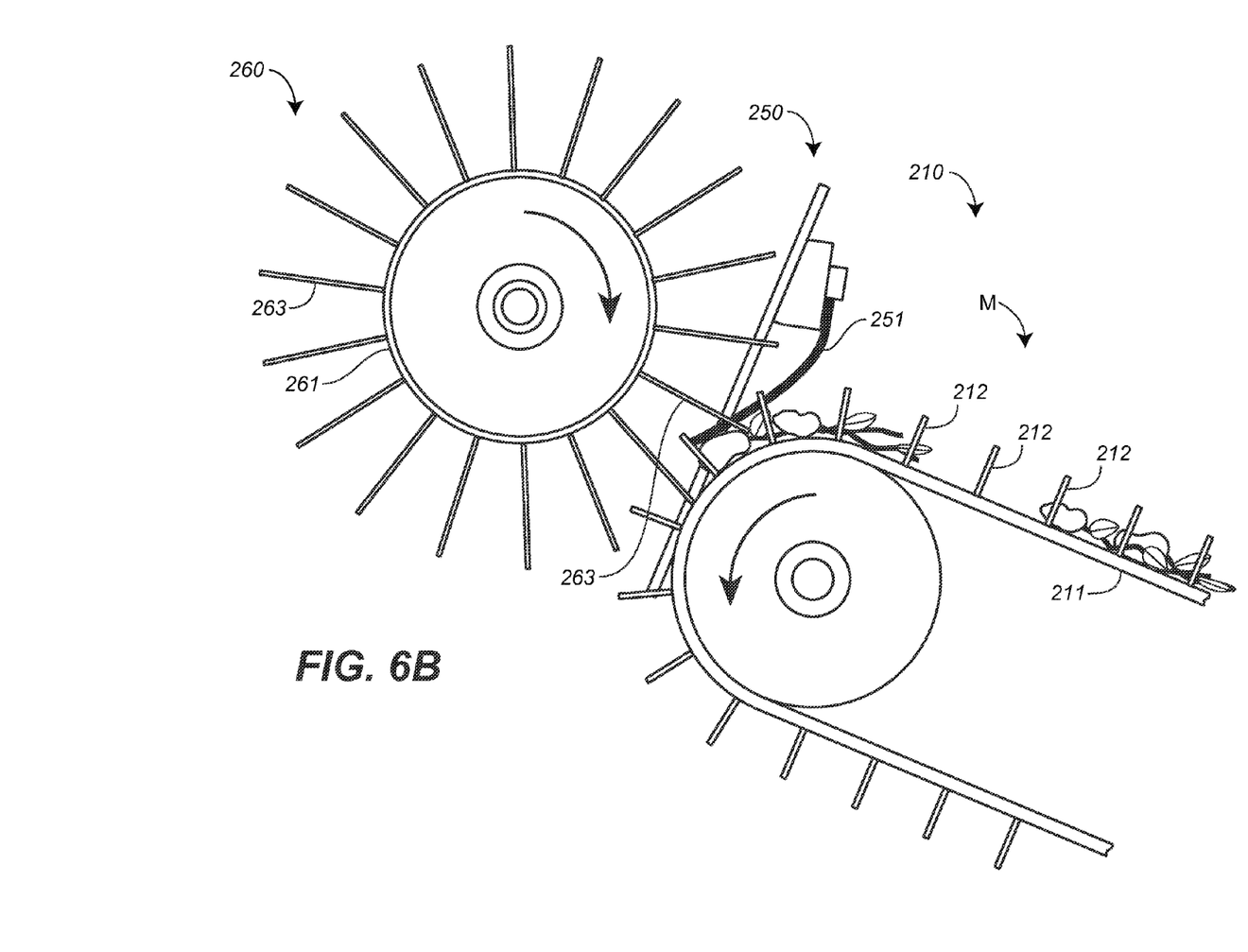
Figure 6C:
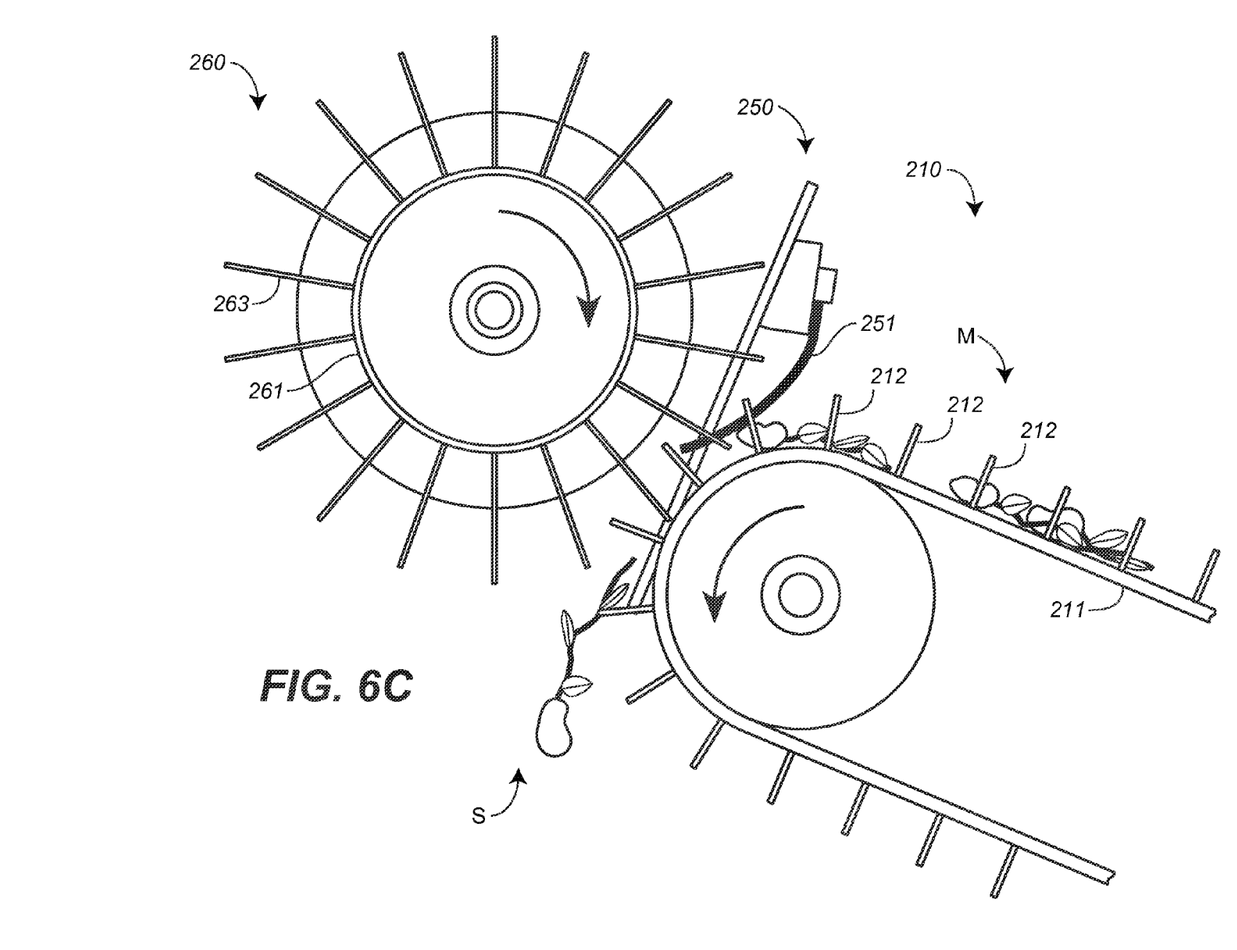

Hold-back unit 250 prevents agricultural material M from passing through singulator 100 by retaining the material on one side of the old-back unit 250. FIGS. 6A, 6B, and 6C, are sequential, detailed side views showing material being transported by the pull-through unit 260 through the hold-back unit 250. As shown in FIG. 6A, agricultural material M is transported on conveyor belt 211 towards hold back unit 250. As shown in FIG. 6B, tines 263 rotate through mesh 251 and contacts agricultural material M, which may also be restrained by pins 212. FIG. 6C shows tines 263 having pulled a single plant S from agricultural material M, which may then pass through sorting system 20.

It is preferred that the force placed on agricultural material M, as in FIGS. 6A-6C results in at least some intertwined plants being separated, and thus individual plants being delivered to belt 21.

It is important that the various component of singulator 100, and specifically those of rake-back unit 220, hold-back unit 250, and pull-through unit 260 be sized and operated to pull apart plants with intertwined roots without damaging healthy roots.

The dimensions, sizes and speeds of the components of singulator 100 to accomplish singulating plants depends on factors such as the type of plants, the maturity of the plants, and how they were planted, to name a few. While some plants may be separated, and others may be damaged, the inventors have shown that it is possible to separate, or "singulate" in the inventive device.

In certain embodiments, the speed of the various motors and actuators of singulator 100 will be controlled by computer 30 utilizing information from sorting system 20. Thus, for example, the rotational speed of pull-through unit 260 and/or height h may be adjusted if not enough plants are singulated, or if too many plants are being damaged in the singulator. This control may be accomplished by a feedback loop that will control the speeds of motors 214, 227, and 265, and the length of actuator 224. The motor speeds may be regulated, for example and without limitation, through separate variable frequency drives are linked to a programmable logic controller, which is in communication with computer 30. Additionally, sensors, such as proximity switches, which may be provided that sense the overload of too much material against hold-back unit 250, and which may slow down or stop singulator 100.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

We claim:

1. An apparatus having a first portion to accept agricultural material and a second portion to provide individual plants from the agricultural material, said apparatus comprising:
   a conveyor having one or more belts extending from a first conveyor end at the first portion and a second conveyor end;
   a plurality of flexible elements having a first side contacting the second conveyor end and a second side opposing said second conveyor end; and
   a pull-through device at the second portion, where said pull-through device includes a plurality of tines, and where the pull-through device moves the plurality of tines through said plurality of flexible elements, such that said conveyor moves accepted agricultural material from the first portion to the first side of said plurality of flexible elements, and said plurality of tines moves through said plurality of flexible elements to separate individual plants from agricultural material at said first side and provide individual plants at said second side.

2. The apparatus of claim 1, wherein said one or more belts include a plurality of pins extending away from said belt.

3. The apparatus of claim 1, wherein said conveyor moves at a speed of from 1 m/min to 3 m/min.

4. The apparatus of claim 1, wherein said plurality of flexible elements includes a thermoplastic.

5. The apparatus of claim 4, wherein said thermoplastic is polypropylene.

6. The apparatus of claim 1, where said pull-through device includes a rotating drum, and wherein each of said plurality of tines radially protrudes from said rotating drum.

7. The apparatus of claim 6, wherein each of said plurality of tines includes a torsion spring attached to said rotating drum.

8. The apparatus of claim 6, wherein the tines have a first end attached to said rotating drum and a second end that rotates about the center of said rotating drum at a radius of 0.5 m.

9. The apparatus of claim 1, further including a device to limit the height of agricultural material on said conveyor.

10. The apparatus of claim 9, wherein said device includes a moving belt positioned over said conveyor.

11. The apparatus of claim 1, further including a system to analyze and sort the agricultural material from said pull-through device.

12. The apparatus of claim 11, where said system analyzes images of the agricultural material.

13. The apparatus of claim 11, where the system sorts individual plants.

14. The apparatus of claim 11, where the system sorts intertwined plants.

15. The apparatus of claim 14, where the intertwined plants are provided to the conveyor.

16. The apparatus of claim 1, wherein said plurality of flexible elements includes a row of wires, strips, or bristles.

17. The apparatus of claim 1, wherein said plurality of flexible elements includes strips of polypropylene or rubber.

18. The apparatus of claim 1, wherein said plurality of flexible elements includes wires.

19. A method for processing agricultural material, said method comprising:
providing two or more plants having intertwined roots to a plurality of flexible elements; and
pulling one plant of said two or more plants through said plurality of flexible elements,
where said pulling includes moving a plurality of tines from a first side of the plurality flexible elements to a second side of the plurality flexible elements, such that at least one individual plant is pulled through the plurality flexible elements, and
wherein said moving includes rotating each of said plurality of tines in a circular path perpendicular to said plurality of flexible elements.

20. The method of claim 19, further comprising:
automatically separating individual plants from intertwined plants.

21. The method of claim 19, wherein said plurality of flexible elements includes a row of wires, strips, or bristles.

22. The method of claim 19, wherein said plurality of flexible elements includes from strips of polypropylene or rubber.

23. The method of claim 19, wherein said plurality of flexible elements includes wires.

24. A method for processing agricultural material, said method comprising:
providing two or more plants having intertwined roots to a plurality of flexible elements; and
pulling one plant of said two or more plants through said plurality of flexible elements; and
limiting the height of agricultural material provided to the plurality of flexible elements.

25. A method for processing agricultural material, said method comprising:
providing two or more plants having intertwined roots to a plurality of flexible elements;
pulling one plant of said two or more plants through said plurality of flexible elements;
automatically separating intertwined plants from other agricultural material; and
providing the separated intertwined plants to the first side of said plurality of flexible elements.

26. The method of claim 25, wherein said plurality of flexible elements includes a row of wires, strips, or bristles.

27. The method of claim 25, wherein said plurality of flexible elements includes from strips of polypropylene or rubber.

28. The method of claim 25, wherein said plurality of flexible elements includes wires.

29. A method of processing agricultural material comprising:
providing two or more plants having intertwined roots to a conveyor having one or more belts extending from a first conveyor end at the first portion and a second conveyor end;
transporting, on said conveyor, said two or more plants to a first side of a plurality of flexible elements having a first side contacting the second conveyor end and a second side opposing said second conveyor end; and
moving a plurality of tines from a second side of said plurality of flexible elements to said first side of said plurality of flexible elements, such that said tines pull one plant of said two or more plants having intertwined roots through said plurality of flexible elements.

30. The method of claim 29, wherein said plurality of flexible elements includes a row of wires, strips, or bristles.

31. The method of claim 29, wherein said plurality of flexible elements includes from strips of polypropylene or rubber.

32. The method of claim 29, wherein said plurality of flexible elements includes wires.

* * * * *